(12) United States Patent
Voorhees et al.

(10) Patent No.: US 8,506,302 B2
(45) Date of Patent: Aug. 13, 2013

(54) SYSTEM, METHOD AND APPARATUS FOR AUTOMATIC GENERATION OF REMEDIAL TRAINING

(75) Inventors: James W. Voorhees, Vancouver, WA (US); Nathan P. Stahlman, Vancouver, WA (US); Aaron M. Purvis, Vancouver, WA (US)

(73) Assignee: Instructional Technologies, Inc., Vancouver, WA (US)

( * ) Notice: Subject to any disclaimer, the term of this patent is extended or adjusted under 35 U.S.C. 154(b) by 80 days.

(21) Appl. No.: 13/153,698

(22) Filed: Jun. 6, 2011

(65) Prior Publication Data

US 2012/0308964 A1  Dec. 6, 2012

(51) Int. Cl.
*G09B 9/02* (2006.01)

(52) U.S. Cl.
USPC ............................................ 434/62; 434/219

(58) Field of Classification Search
USPC .................... 434/29, 350, 336, 362, 322, 323
See application file for complete search history.

(56) References Cited

U.S. PATENT DOCUMENTS

| | | | | |
|---|---|---|---|---|
| 3,916,534 A * | 11/1975 | Riccio | .............................. | 434/64 |
| 5,865,624 A * | 2/1999 | Hayashigawa | ................... | 434/66 |
| 6,227,862 B1 * | 5/2001 | Harkness | ......................... | 434/65 |
| 7,479,897 B2 * | 1/2009 | Gertsch et al. | ................ | 340/936 |
| 8,147,247 B1 * | 4/2012 | Reese | .............................. | 434/29 |
| 8,323,025 B2 * | 12/2012 | Freund et al. | .................... | 434/65 |
| 2006/0040239 A1 * | 2/2006 | Cummins et al. | ............... | 434/62 |
| 2008/0108022 A1 * | 5/2008 | Freund | ............................ | 434/69 |
| 2009/0181349 A1 * | 7/2009 | Harkness | ......................... | 434/69 |
| 2009/0202964 A1 * | 8/2009 | Simon | ............................. | 434/62 |
| 2010/0143872 A1 * | 6/2010 | Lankteee | ........................ | 434/65 |

* cited by examiner

*Primary Examiner* — Kang Hu
(74) *Attorney, Agent, or Firm* — Larson & Larson, P.A.; Frank Liebenow

(57) ABSTRACT

A system automatically generates a remedial training lesson from a plurality of frames located within the storage. Each frame has a component of training. After an incident occurs (e.g. accident, violation, citation, etc.), details of the incident are saved. The incident is associated with a person (e.g. the driver, pilot, etc. that had the incident). Software runs on a computer system and selects at least one remedial frame from the plurality of frames based upon data within the details of the incident and creates a remedial lesson. The remedial lesson, which includes the selected frame(s) from the plurality of frames, is provided to the person.

20 Claims, 13 Drawing Sheets

ACC RPT

Time: 3:45 PM
Weather: Light Rain, Roads wet
Location: Rt. 66
Driver: Mack
License: 111-222-3333

Damage:
Injury:

☐ Daylight ☐ Dawn/Dusk ☐ Dark
Speed: 63 Speed limit: 55

Driver was:
☐ entering intersection ☐ entering road
☐ exiting highway ☐ merging
☐ making left turn ☐ making right turn
☐ making U turn ☐ parking
☐ backing up ☐ moving forward

*FIG. 7*

SYSTEM, METHOD AND APPARATUS FOR AUTOMATIC GENERATION OF REMEDIAL TRAINING

FIELD

This invention relates to the field of training and more particularly to a system for providing directed training after an incident.

BACKGROUND

Computer-based training is well known. Many learning institutions have quickly adopted various forms of computer-based training that provides courses and evaluate students using readily available computers.

Most training is provided in pre-defined lessons presented on a computer display. After presenting the content, responses are solicited from the target of the lesson (e.g. student driver) through keyboard or touch-screen inputs. In that, a complete, beginning-to-end lesson is provided to the target of the lesson (e.g. a student). The lesson often provides content related to the subject of the lesson and sometimes provides a quiz or test that evaluates the target's (e.g. student's) comprehension of the content. Often, the lesson repeats the presentation of the content when the target (e.g. student) does not demonstrate sufficient comprehension of the content as evidenced by a non-passing grade on the quiz or test.

Although computer-based training is used in many learning situations including educational institutions, businesses, and government, one particular area of training has proved very beneficial. This particular area is in operator training, such as for an operator of a vehicle. Operator or driver training is often provided to new operators/drivers before the operator/driver has the opportunity to operate an actual vehicle. For example, before actually driving on roads with other drivers, high school students are often provided in-class training covering the basic fundamentals of operating an automobile. This training helps the new driver understand the operation of the target vehicle (e.g. how and when to turn on the lights, wipers, which pedal is the brake and which is the gas, etc.). Such training is often computer-based training with a fixed, scripted lesson. Each student that is taking driver education receives the same lesson and the lesson is often repeated until sufficient comprehension is achieved.

As for remedial training, often after an accident or a moving violation, some states, including Florida, provide an opportunity for the driver involved in the incident to remove the accident or moving violation from their driving record by taking a remedial drivers educational course. This training is offered as computer-based training and is often provided online (e.g. through the Internet). Such training has a fixed, scripted lesson. The driver who made an illegal left turn and the driver who was ticketed for speeding are presented with the same scripted lesson.

Many professions offer computer-based training for operators of motor vehicles, boats, planes, trains, motorcycles, trucks, etc. This training typically consists of pre-scripted lessons progressing in an orderly fashion from basic principles and operation up to more complex subjects. For example, computer-based training for a truck driver begins with basic operation of the target vehicle and progresses to more the complicated aspects of operation, accident avoidance, operating under adverse weather, etc.

Complications arise when an operator finishes the computer-based training, completes behind the wheel training, becomes certified to operate the target vehicle and operates such a vehicle in the course of their employment, and subsequently has something happen such as an accident or moving violation. Often, for state or federal requirements or for insurance/liability requirements, the employing company needs to provide remedial training to demonstrate that they recognize the issue and are taking steps to prevent the issue from occurring again in the future. In the past, companies have used the same computer-based training offered during the initial operator training as remedial operator training. This is wrought with tedium and boredom, in that the operator often knows most of the content and is only having problems with one specific area. This is similar to the prior example, in which all drivers are provided a pre-designed course to take after receiving any type of moving citation. It does not concentrate on the issue and therefore, is less effective in correcting the issue.

What is needed is a system that will deliver directed remedial training based upon data related to an incident.

SUMMARY

Many training systems contain portions of entire lessons (i.e., frames), typically stored as database records or individual files in a storage area. Such training systems often compile several of the frames into several individual lessons, repeating frames across different lessons as needed. For example, a frame dealing with starting the engine is included in a basic lesson on starting the vehicle and also included in a more advanced lesson on starting a vehicle in cold weather, etc.

Having these frames available provides a basis for a computer-based system that provides remedial training. In that, remedial training is training that is wanted, needed or required after an incident such as an accident, traffic citation, near miss (for pilots), person-overboard (for boat captains), etc. Instead of having the operator (e.g. driver, pilot, captain, etc.) repeat a pre-scripted lesson that often contains many frames, many of which may not be related to the incident, the described system uses details of the incident to generate a remedial lesson that is targeted to the incident. A targeted lesson contains frames that the operator needs to review to learn more about what happened in the incident and, hopefully, correct behavior that led to the incident.

In one embodiment, a remedial lesson generator is disclosed including a computer system that has access to storage with a plurality of frames located within the storage. Each frame has a component of training. After an incident (e.g. accident, violation, citation, etc.) occurs, details of the incident are stored within the storage and the incident is associated with a person (e.g. the driver, pilot, etc. that had the incident). Software runs on the computer system and selects at least one remedial frame from the plurality of frames based upon data within the details of the incident and the software creates a remedial lesson. The remedial lesson includes the selected frame(s) from the plurality of frames.

In another embodiment, a method of remedial training is disclosed. The method of remedial training is used after an incident that is associated with a person (e.g., a driver, pilot, etc.). The method includes (a) storing a plurality of frames where they are accessible by a computer system and (b) storing a plurality of records in a profile database that is also accessible by the computer system. Each of the records contains data related to an operator (e.g. any of a number of drivers, pilots, etc. that are known). (c) Details of an incident (e.g. an accident or violation, etc.) related to the person are received and the details are stored accessible by the computer system and responsive to such, (d) the computer system generates a remedial lesson for the person by assembling a subset of the plurality of frames that are related to the details of the incident into the remedial lesson. The (e) remedial lesson is presented to the person and (f) results of the remedial lesson are recorded in a record of a profile database associated with the person.

In another embodiment, a computer-based system for remedial lesson generation is disclosed including. The computer-base system includes a computer that is operatively interfaced to a storage, in which, a plurality of frames are stored. Each of the frames has a component of training. The system accepts an incident and the incident is stored within the storage. The incident is associated with an operator of a vehicle (e.g., a truck driver, pilot, etc). Software runs on the computer system to select at least one frame from the frames in the storage. The selection is based upon data within the incident. The software creates a remedial lesson for the operator that includes at least one frame related to the incident.

BRIEF DESCRIPTION OF THE DRAWINGS

The invention can be best understood by those having ordinary skill in the art by reference to the following detailed description when considered in conjunction with the accompanying drawings in which:

FIG. 7 illustrates an exemplary accident report.

DETAILED DESCRIPTION

Figure 1:
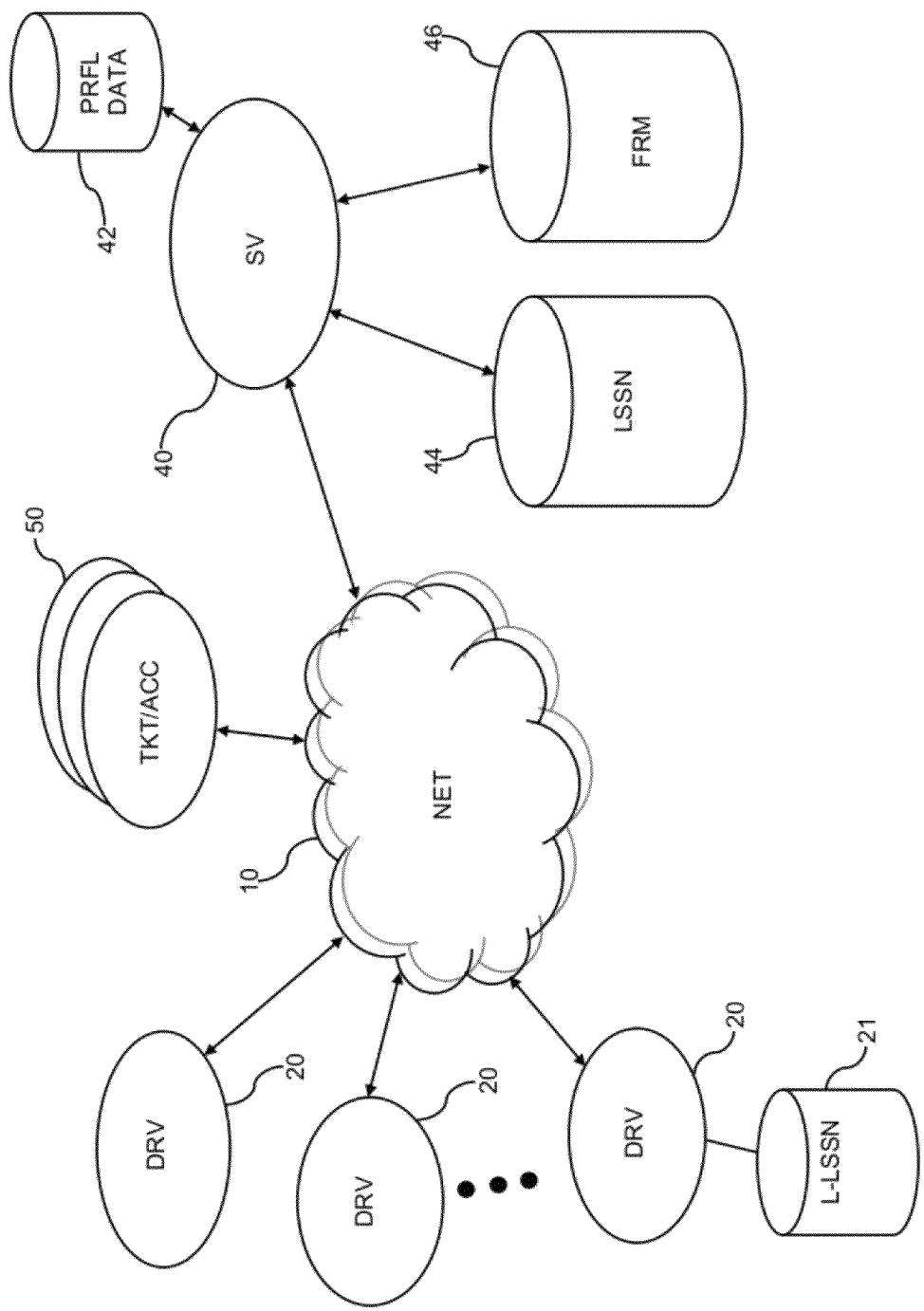
FIG. 1 illustrates a schematic view of a computer-based training system.

Reference will now be made in detail to the presently preferred embodiments of the invention, examples of which are illustrated in the accompanying drawings. Throughout the following detailed description, the same reference numerals refer to the same elements in all figures.

The described system pertains to any type of computer-based training for any target person. Throughout this description, the target of the remedial training is directed to a target person who is a truck driver. The described system is equally applicable to any other type of operator, including operators of other types of vehicles (cars, motorcycles, boats planes, fork-lifts, etc.) and operators of practically anything such as machinery (CNC machines, cash registers, etc.), etc. The described system is anticipated for use in any training/remedial-training in which an operator (e.g. driver) has the opportunity to make a mistake, the mistake is recorded and the operator is provided remedial training to, hopefully, prevent the mistake from occurring in the future. For example, if an operator of a cash register is reported for not checking the expiration date on coupons, the described invention will provide directed, remedial training related to this particular operation of a cash register.

For simplicity purposes, the following description uses, as an example, a truck driver as the target of the training. Truck drivers often receive plenty of computer-based training before operating a truck. When a truck driver has an incident (e.g. a moving violation/citation, an accident or other damage to the truck/rig), the company that owns the rig is often required to provide remedial training. This is often a government authority requirement, an insurance company requirement or instituted by the conscience/philosophy of the company.

Referring to FIG. 1, a schematic view of a system of the present invention is shown. The overall structure, communication paths, client-server architecture and data relationships shown are one example of a computer-based training system and are not meant to limit this disclosure in any way. Many different organizations and architectures are anticipated and included here within. The present invention is intended to operate with any known network 10, preferably operating with the Internet 10 (a.k.a. the World Wide Web). The present invention provides any number of end-user terminals 20 (e.g. personal computers at which an operator is provided one or more lessons) with a system for computer-based training and remedial training. The server 40 provides the services of managing the lessons 44, delivering the lessons 44 to the end-user (e.g. student) terminals 20 and any billing/tracking, etc. The server system includes profiles 42 for student/driver authorization, for tracking training provided to each student/driver, recording statistics related to each student/driver and for authorizing access to one or more of the lessons 44. Records within the profile database 42 are associated with each student/driver. Access is provided to one or more lessons, for example, by the driver or driver's company purchasing one or more lessons.

In the preferred embodiments, the lessons 44 are made up of several individual, frames 46. A frame 46 provides a component of a lesson 44. In some embodiments, a frame 46 includes training on a single subject while in other embodiments, a frame 46 includes training on a few, minor subjects. For example, one lesson 44 consists of several frames 46 related to each other while another lesson 44 consists of some of the same frames 46 as well as other frames 46. For simplicity, we will describe the frames 46 as content, quiz and descriptive data (e.g. metadata), although it is anticipated that the frames 46 include other optional components such as difficulty level, sequence data, cost data, repeat counts, etc., all possible frame 46 contents are included here within.

It is anticipated that any or all databases or storage areas 42/44/46 are locally interfaced to the server 20, remotely interfaced to the server 40 (e.g., Network Attached Storage—NAS) and/or remotely interfaced to the server 40 over a network, either a local area network or wide area network. Any computer-storage topology is anticipated and included here within.

In some embodiments, one or more lessons 44 and the frames 46 needed for the lesson(s) 44 are downloaded to a client 20 and stored as a local lesson 21. In this example, the lesson(s) 44/21 are provided at the client terminal 20 without the need to be connected to the server 40 and, at any time during the lesson(s) 44/21 or after the lesson(s) 44/21, any accumulated data is uploaded to the server for storage in the driver profiles database 42.

Although the clients 20 are shown as computers connected to the server 40 through the Internet 10, any known or future client 20 is anticipated such as a smart phone or tablet computer connected through the Internet 10 or through the cellular network, terminals/computers that are directly connected to the server 40, etc.

The server also interfaces to various sources of incidents 50. In some embodiments, the incidents 50 are transferred to the server 40 with any known network or direct connection, as known in the industry. As shown in the example of FIG. 1, the incidents 50 are transferred to the server 40 through the Internet 10. In some embodiments, the incidents 50 are entered into the system by a data entry person (not shown) at a client computer 20.

Figure 2:
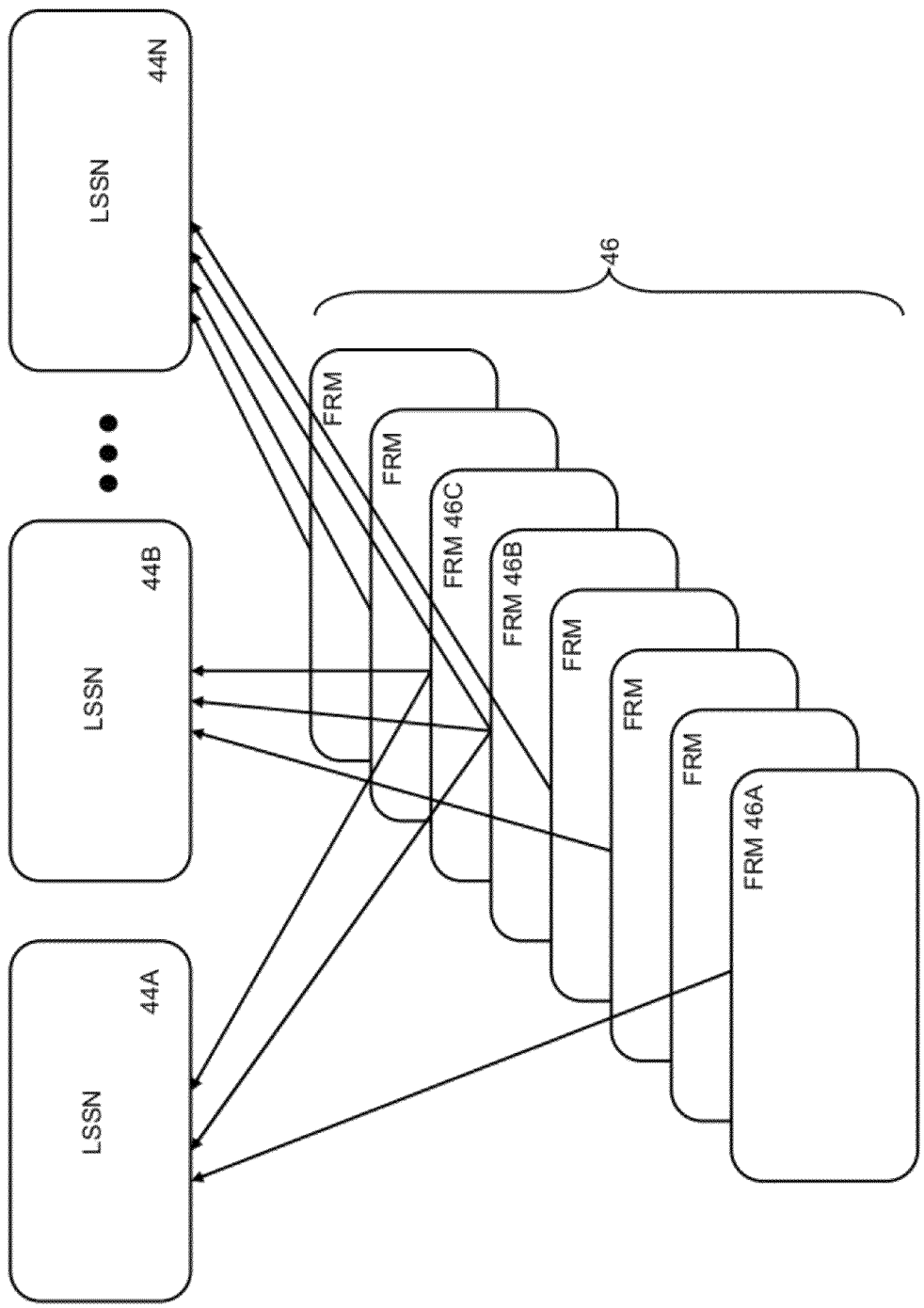
FIG. 2 illustrates a typical pre-scripted course data relationship of a computer-based training system.

Referring to FIG. 2, a typical pre-scripted course data relationship of a computer-based training system is shown. This diagram shows the relationship between a plurality of individual frames 46 and a plurality of lessons 44A/44B/44N. As an example, lesson for shifting 44A includes a frame 46A dealing with clutch operation, a frame 46B dealing with shifter patterns and a frame 46C dealing with double-clutching. In this example, frame 46B and 46C is also used in lesson 44B and frame 46B is also used in lesson 44N.

Figure 3:
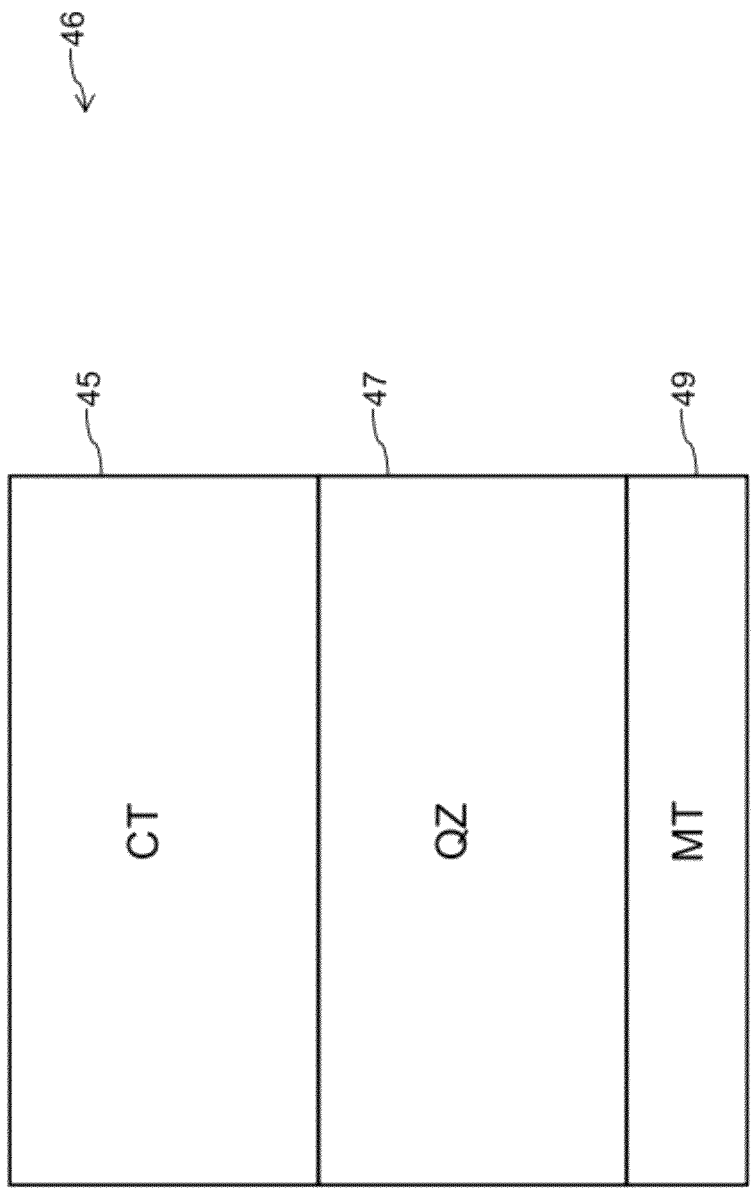
FIG. 3 illustrates a typical basic frame of a computer-based training system.

As shown in FIG. 3, preferably, each frame 46 consists of learning content 45, some sort of quiz or test 47 and, optionally, identification information or metadata 49. In this, each frame 46 preferably provides a basic level of training on a given subject and provides a quiz or test 47 that is used by the lesson to determine if the target operator has gained a sufficient understanding of the subject material. In the prior art, the lesson 44 is created by a script writer who, with the aid of the descriptive identification information or metadata 49, assembles multiple frames 46 into each lesson 44. Although shown as part of each frame 46, it is anticipated that the descriptive data 49 be stored/located in any location as known in the industry including as part of the file in which the frame 46 is stored, in an external file, in a secondary database, etc. The descriptive data 49 provides script writers with information to build lessons and provides the system described later with information used to determine which frames 46 are needed for remedial training.

In the preferred embodiment, there is an index for accessing the frames 46 such that each of the frames 46 are related to one or more subjects, keywords, numerical values, etc. In the example shown in FIG. 3, the index is metadata 49 associated with each frame 46. For example, a frame 46 dealing with speeding has keywords stored in the metadata field 49 related to speed such as "speeding," "gas pedal," and "speed-limit." In this, the metadata 49 is searchable for keywords and/or phrases that match, for example, words in an incident report. It is known how to search files for keywords/phrases, including pre-processing of the keywords/phrases to provide common terminology. In other embodiments, other search strategies are anticipated including having a separate index file, each index pointing to one or more frames 46 or using a database, etc.

Figure 4:
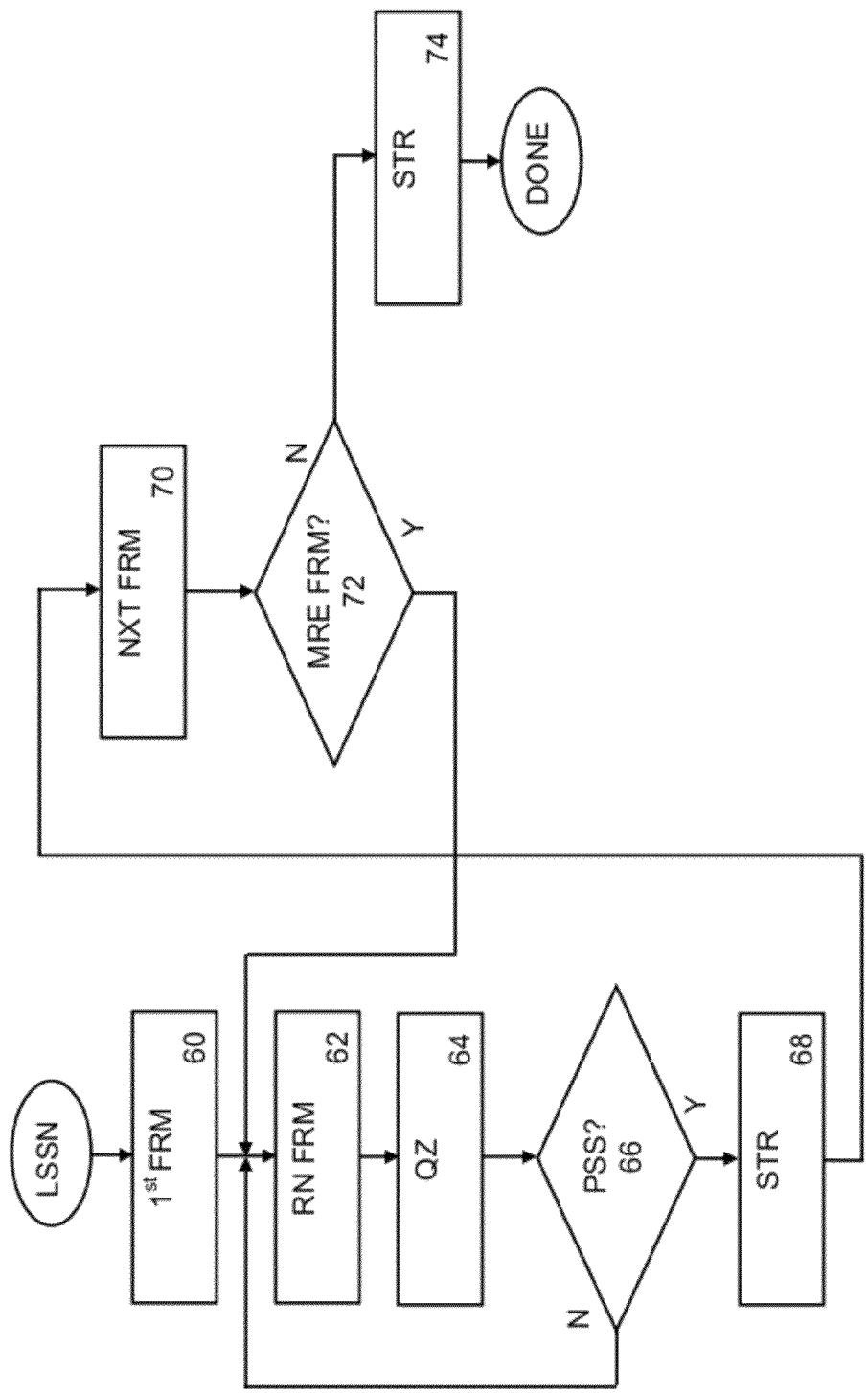
FIG. 4 illustrates a flow chart of a computer-based training system of the prior art.

Referring to FIG. 4, a flow chart of a computer-based training system of the prior art is shown. In the prior art, the lessons 44 (see FIG. 1) previously created, for example, by the script writer is presented to the trainee. The first frame 46 (see FIGS. 1 and 2) of the lesson 44 is selected 60 and the content 45 (see FIG. 3) of the frame 46 is run/presented 62, presenting the content 45 of the subject to the trainee. Any form of content 45 presentation is anticipated, including flash frames, static text/graphic pages, imbedded text/video/audio, etc.

After presentation to the trainee, often, a quiz 47 (see FIG. 3) is presented 64 to ascertain how much was absorbed by the trainee. If the trainee does not demonstrate possession of enough knowledge 66 (e.g. does not pass 64 the quiz 47), the same frame 46 is re-run 62, re-presenting the content 45 of the subject to the trainee and quiz 47 is again presented 64 to ascertain how much was absorbed by the trainee. The above steps repeat until the trainee demonstrates possession of enough knowledge 66 and a next frame 46 from the lesson 44 is selected. In some prior art, results of the lesson 44 are stored 68 in the driver database 42 (see FIG. 1). Such results often include the number of times the content 45 was repeated before a passing grade was achieved on the quiz 47, the length of time for each pass and the quiz 47 scores for each time the quiz 47 was taken.

Now, the next frame is selected 70. If there are no frames 46 remaining 72 in the lesson 44, results and/or completion records are optionally saved 74 to the driver database 42 and this training lesson 44 is complete. If there are remaining 72 frames 46 in the lesson 44, the above steps are repeated using the next frame 46.

Figure 5:
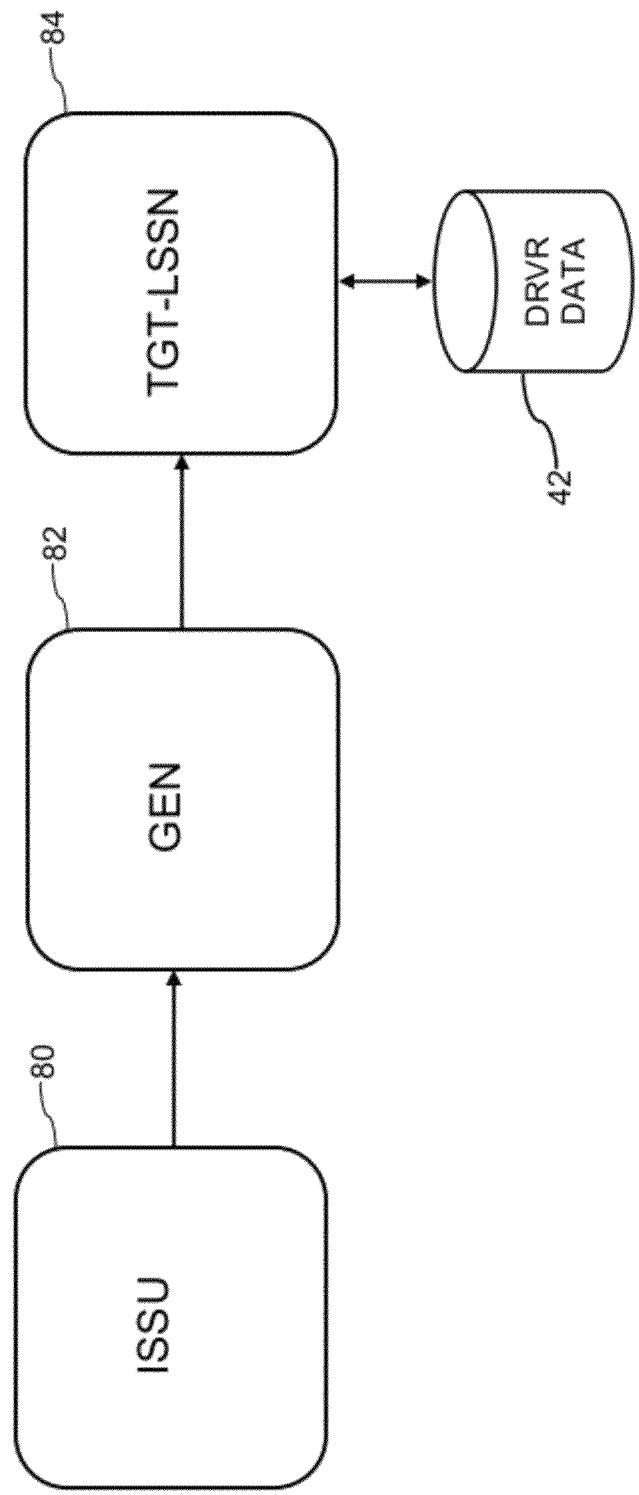
FIG. 5 illustrates a basic flow of a computer-based training system.

Referring to FIG. 5, a basic flow of a computer-based training system is shown. The computer-based training system provides pre-scripted lessons 44 (see FIG. 1) as described above, typically used in initial operator training and scheduled refresher training (e.g. yearly refresher lessons).

Now, if the operator has an incident 80 such as a traffic citation or an accident, a remedial lesson 84 is generated 82 and delivered to the operator. For example, if the incident 80 is a citation that the operator received for speeding, the lesson generator 82 compiles a set of frames 46 (see FIGS. 1 and 2) into a remedial lesson 84, such as frames 46 related to maintaining a safe speed, safe operating distance. If the citation indicates that the roads were wet when the incident occurred, the generator 82 adds additional frames 46 dealing with adjusting speed to account for climate conditions into the remedial lesson 84. If the citation indicates that the incident occurred at night, additional frames 46 are included dealing with maintaining proper speeds when visibility is reduced. In this way, a remedial lesson 84 is generated that deals with many of the primary and secondary issues indicated on the citation 80. The frames 46 that are assembled into the remedial lesson 84 are referred to as remedial frames 46. Frames 46 are reused in any number of lessons 44 and/or remedial lessons 84.

In another example related to individual drivers, instead of providing the same remedial lesson to all drivers, independent of what type of incident occurred, in lieu of recording the incident on the driver's permanent record, motor vehicle systems will now have tools to automatically create a proper remedial lesson 84 relating to the events and conditions of the incident. For example, if the driver was speeding, frames 46 relating to maintaining proper speed are included in the remedial lesson 84. If the driver made an improper turn, frames 46 relating to turning and, perhaps, related to proper use of turn signals are included in the remedial lesson 84.

The generator 82 utilizes many different algorithms to generate the remedial lesson 84. In some embodiments, the generator 82 searches for keywords in the description of the frames 46. For example, if the incident 80 includes "speeding" then all frames 46 having the keyword, "speeding" in the descriptive data 49 (see FIG. 3) are included in the remedial lesson 84. In some embodiments, multiple data from the incident 80 are analyzed to determine what keywords to search for in the descriptions 49. For example, "speeding" and a time that is later than 7 PM and earlier than 6:30 AM may add a search term of "night driving." In some embodiments, the data is conditionally searched, or the criteria are modified, based upon the season, calendar, or even the local weather recorded on the date of the incident 80. An exemplary data set is: an incident 80 that includes "speeding," the date is "December 15," and the location is Chicago, Ill. The generator 82, having access to prior weather and road conditions, determines that the roads were snow covered on December 15 and adds "driving in snow" to the keyword search to add frames that deal with driving in snow.

For various reasons, including recording that the driver who had the incident 80 has completed remedial training, results of the remedial lesson 84 are stored in the driver training database 42.

Figure 6:
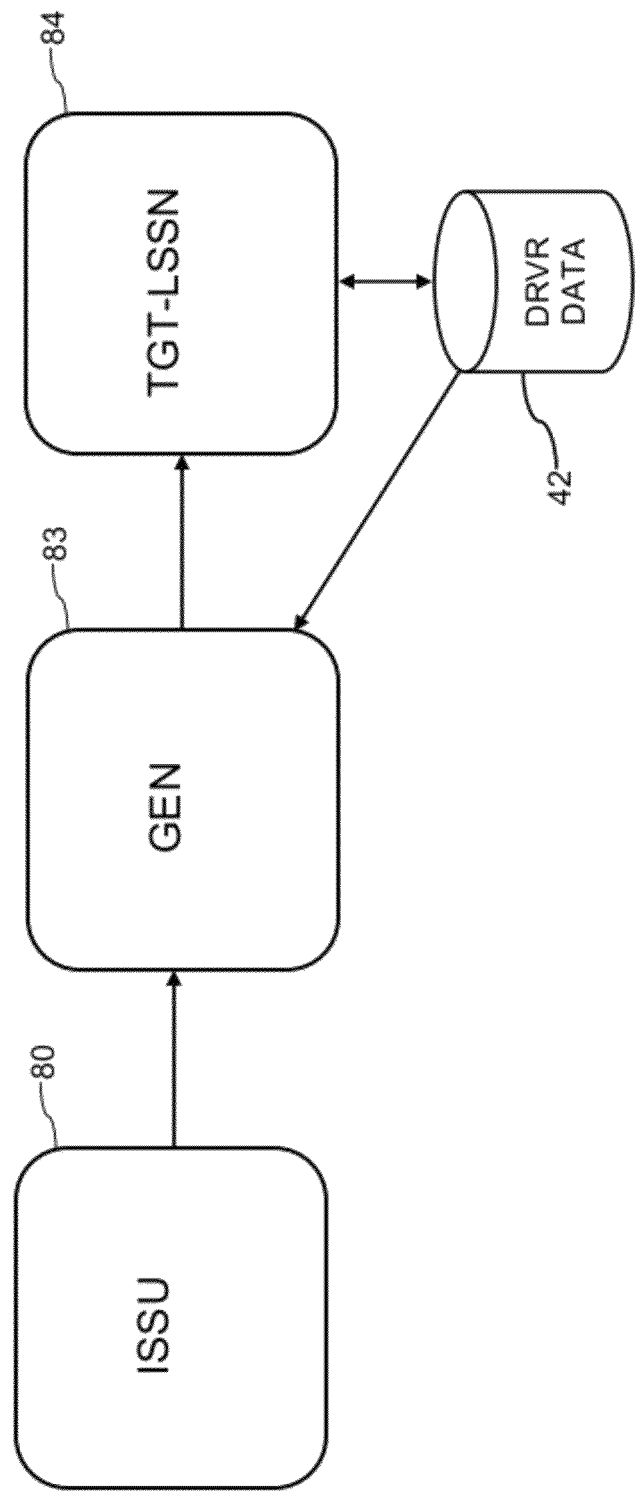
FIG. 6 illustrates another basic flow of a computer-based training system.

Referring to FIG. 6, another basic flow of a computer-based training system is shown. After the operator has an incident 80 such as a traffic citation or an accident, a remedial lesson 84 is generated 83 and delivered to the operator. In this embodiment, prior data related to the driver from the driver database 42 is consulted in generation of the remedial lesson 84. In some embodiments, the driver database 42 includes driver information such as age, eye-sight, number of years of experience, equipment experience levels (e.g. four years driving a box truck, seven years driving an 18-wheeler), etc. In some embodiments, the driver database 42 includes prior training and completion status. Any type of data related to the driver that is useful in determining what frames 46 (see FIG. 1) are to be included in the remedial lesson 84, are anticipated, and included here within.

For example, if the incident 80 is a citation that the operator received for speeding, the lesson generator 83 also consults the stored driver data 42 and compiles a set of frames 46 into a remedial lesson 84. In this example, the training history of the driver and other known facts, such as previous incidents, previous training provided, age, and eye sight, are also used to generate the remedial lesson 84. For example, frames 46 related to maintaining a safe speed and safe operating distance are included based upon the incident 80, while additional frames 46 are included based upon training history (e.g. this operator is required to review the frames related to night driving every three years, etc.). Additional frames are optionally included based upon other factors such as the age of the driver (e.g. if the operator is over forty, then frames 46 related to glare are included). Furthermore, if the citation indicates that the roads were wet when the incident occurred, additional frames 46 are included into the remedial lesson 84 dealing with adjusting speed to account for climate conditions. If the citation indicates that the incident occurred at night, additional frames 46 are included dealing with maintaining proper speeds when visibility is reduced.

In some embodiments, some of the frames 46 are removed based upon the driver's prior training history as stored in the driver database 42. For example, if the driver having the incident 80 had recently taken the frame 46 regarding turn signaling and scored above ninety on the quiz, then that frame 46 is not required and, in some embodiments, that frame 46 is removed from the remedial lesson 84.

By generating and delivering a remedial lesson 84 that deals with many of the primary and secondary issues indicated by the incident 80, the driver involved in the incident is provided with the required training, focused on the issues where help is needed, and not distracted or bored by ancillary training that is not pertinent to the incident 80.

In another example related to individual drivers, instead of providing the same remedial lesson to all drivers, independent of what type of incident occurred, as some stated provide in lieu of recording the incident on the driver's permanent record, motor vehicle systems will now have tools to automatically create a proper remedial lesson 84 relating to the events and conditions of the incident. For example, if the driver was speeding, frames 46 relating to maintaining proper speed are included in the remedial lesson 84. If the driver made an improper turn, frames 46 relating to turning and, perhaps, related to proper use of turn signals, are included in the remedial lesson 84.

In some embodiments for DMV use, the driver database 42 is the state-wide driver registration database and includes the driver's age, number of years driving, vehicles registered to the driver, insurance data, etc. In these embodiments, the driver database 42 is consulted by the generator 83 to provide targeted remedial lessons 84. For example, if the driver is over forty or has had laser eye surgery, the generator 83 adds frames 46 related to night glare.

For various reasons, including recording that the driver who had the incident 80 has completed remedial training, results of the remedial lesson 84 are stored in the driver training database 42.

Referring to FIG. 7, an exemplary accident report 90 is shown. There are many known ways to report an accident and the data shown in FIG. 7 is but one example. Reports 90 are either captured manually by writing on a paper form or electronically using an electronic device such as a smart phone, tablet or other computer-based device. If captured manually, as with many police accident reports, the data 92/94/96 are entered into the system by data entry personnel. If captured electronically, the data 92/94/96, preferably, are transferred directly to the server 40 as described above. In either embodiment, the data includes, but is not limited to, the driver's name, accident data (i.e., what happened) are transferred to the server 40 (see FIG. 1) and the generator 82/83 (see FIGS. 5 and 6) generates the remedial lesson 84 (see FIGS. 5 and 6). Other data, when available, are transferred to the server to further assist in generating the remedial lesson 84 such as the time, weather conditions, road surface conditions, speed of each vehicle, driver's license numbers, extent of the damage (i.e., estimated cost to repair), etc.

Figure 8:
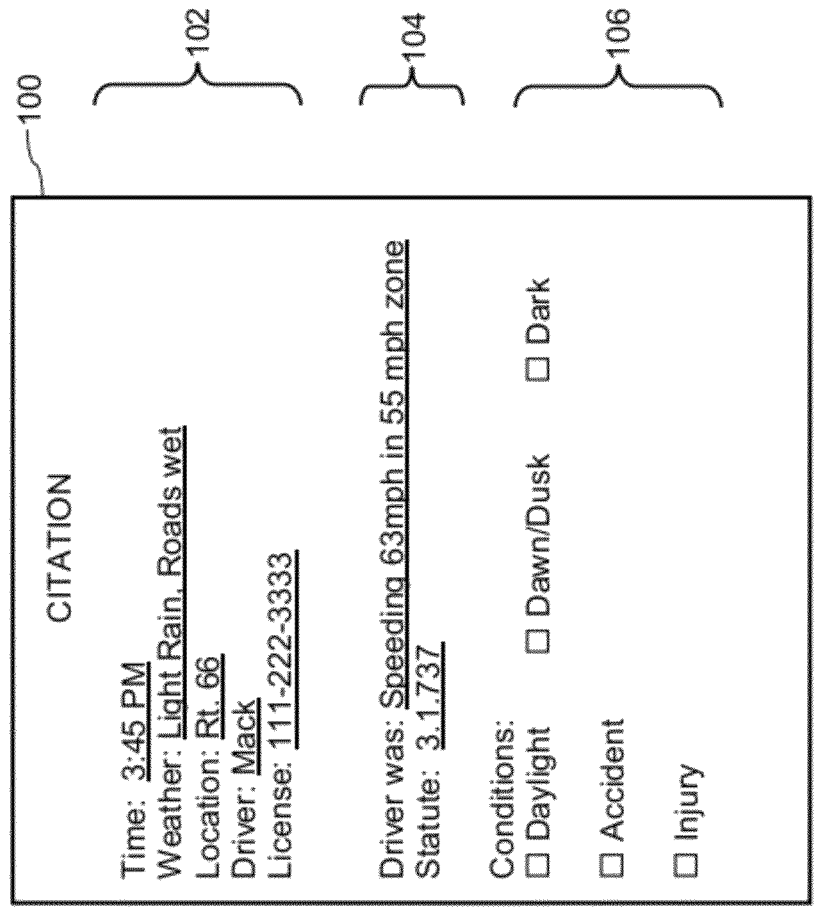
FIG. 8 illustrates an exemplary traffic citation.

Referring to FIG. 8, an exemplary traffic citation 100 is shown. There are many known ways to capture data when a law enforcement officer is citing a driver and the data shown in FIG. 8 is but one example. Traffic citations 100 are either captured manually by writing on a paper form or electronically using an electronic device such as a smart phone, tablet or other computer-based device. If captured manually, as with many existing police citations, the data 102/104/106 are entered into the system by data entry personnel. If captured electronically, the data 102/104/106, preferably, are transferred directly to the server 40 as described above. In either embodiment, the data including, but not limited to, the driver's name, reason for being stopped (what happened) are transferred to the server 40 and the generator 82/83 generates the remedial lesson 84. Other data, when available, are transferred to the server to further assist in generating the remedial lesson 84 such as the time, weather conditions, road surface conditions, speed of each vehicle, driver's license numbers, extent of the damage (i.e., estimated cost to repair), etc.

Figure 9:
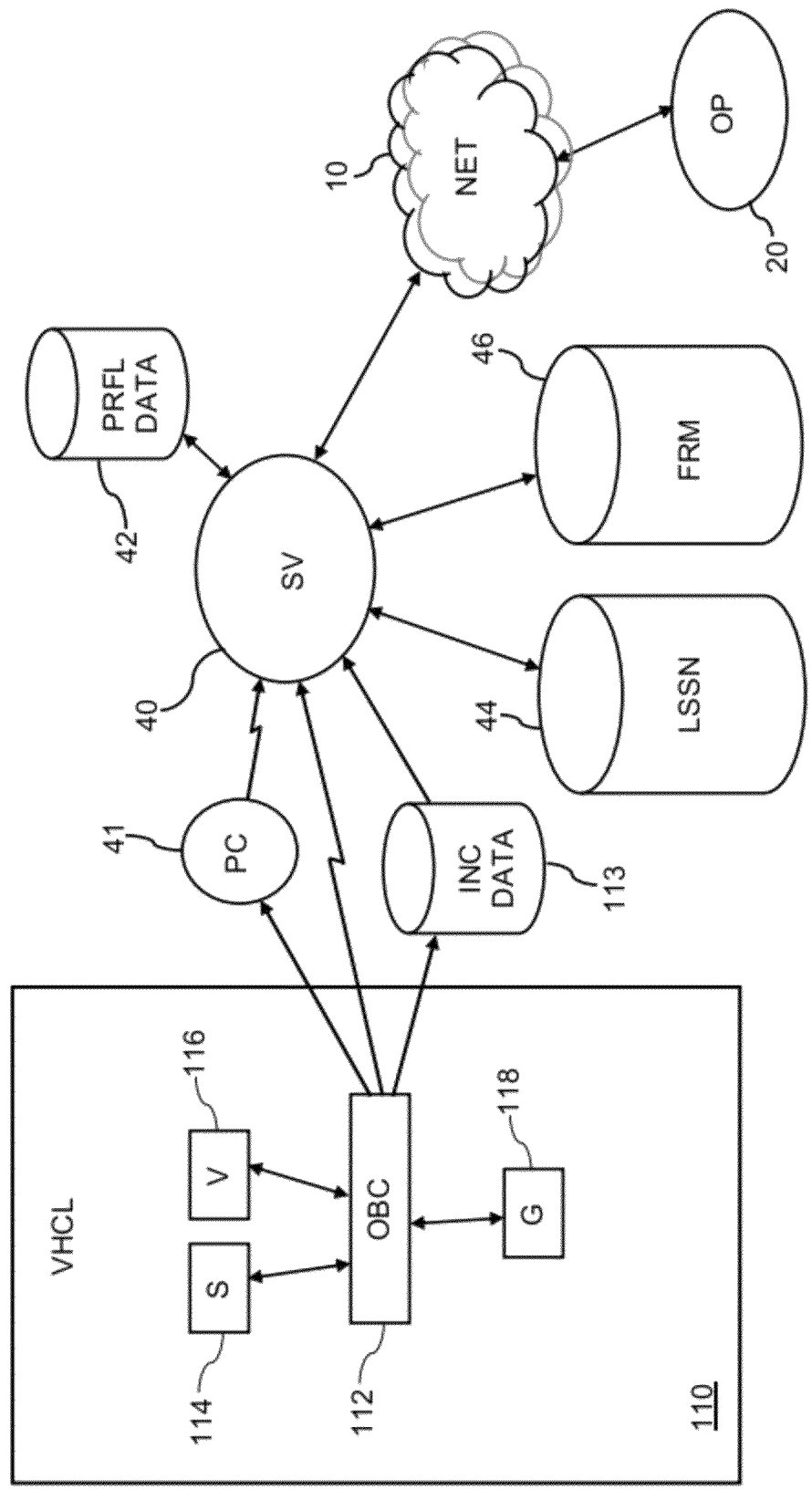
FIG. 9 illustrates incident transfer by a communications link.

Referring to FIG. 9, an exemplary incident is transferred by a communications link. In some vehicles 110, on-board computers 112 constantly monitor various sensors 114, cameras 116 and/or positioning devices 118 and record data such as the location of the vehicle 110, the velocity of the vehicle 110, mechanical inputs to the vehicle 110, environmental data in the vicinity of the vehicle 110, etc. For example, in embodiments in which the vehicle 110 is a truck, one or more cameras 116 are mounted to monitor where the operator (driver) is looking and the road ahead and behind the vehicle (truck) 110. In this example, the sensors 114 provide information such as throttle position, current gear, brake pressure and steering angle. Also in this example, the location sensor 116 is, for example, a Global Positioning Satellite receiver and provides the location of the vehicle (truck) 110 as well as the direction and speed of travel of the vehicle (truck) 110.

In another example in which the vehicle 110 is an airplane, one or more cameras 116 are mounted to monitor where the operator (pilot) is looking and the runway/sky ahead of the vehicle (airplane) 110. In this example, the sensors 114 provide information such as throttle position, lift settings, landing gear position, brake pressure, flaps, etc. Also in this example, the location sensor 116 is, for example, a Global Positioning Satellite receiver or Loran and provides the location of the vehicle (airplane) 110 as well as the direction and speed of travel of the vehicle (airplane) 110.

In embodiments in which there is an on-board computer 112 in or associated with the vehicle 110, data from the various inputs 114/116/118 are recorded or logged within internal memory of the on-board computer 112 and saved for a period of time. When an incident occurs, some or all of the data is saved until needed or erased. In some embodiments, the data related to the incident is transferred to the server 40 by any way known in the industry including, but not limited to, a direct connection between the on-board computer 112 and the server 40 or to an intermediate computer 41 which relays the data to the server 40, wireless transmission from the on-board computer 112 to the server 40 and copying the data from the on-board computer 112 to a memory device 113 (e.g. memory card 113) and the memory device 113 is relocated and read by the server 40. Once the data related to the incident is in the server 40, the computer-based training system generates the remedial lesson 84 using the data.

Figure 10:
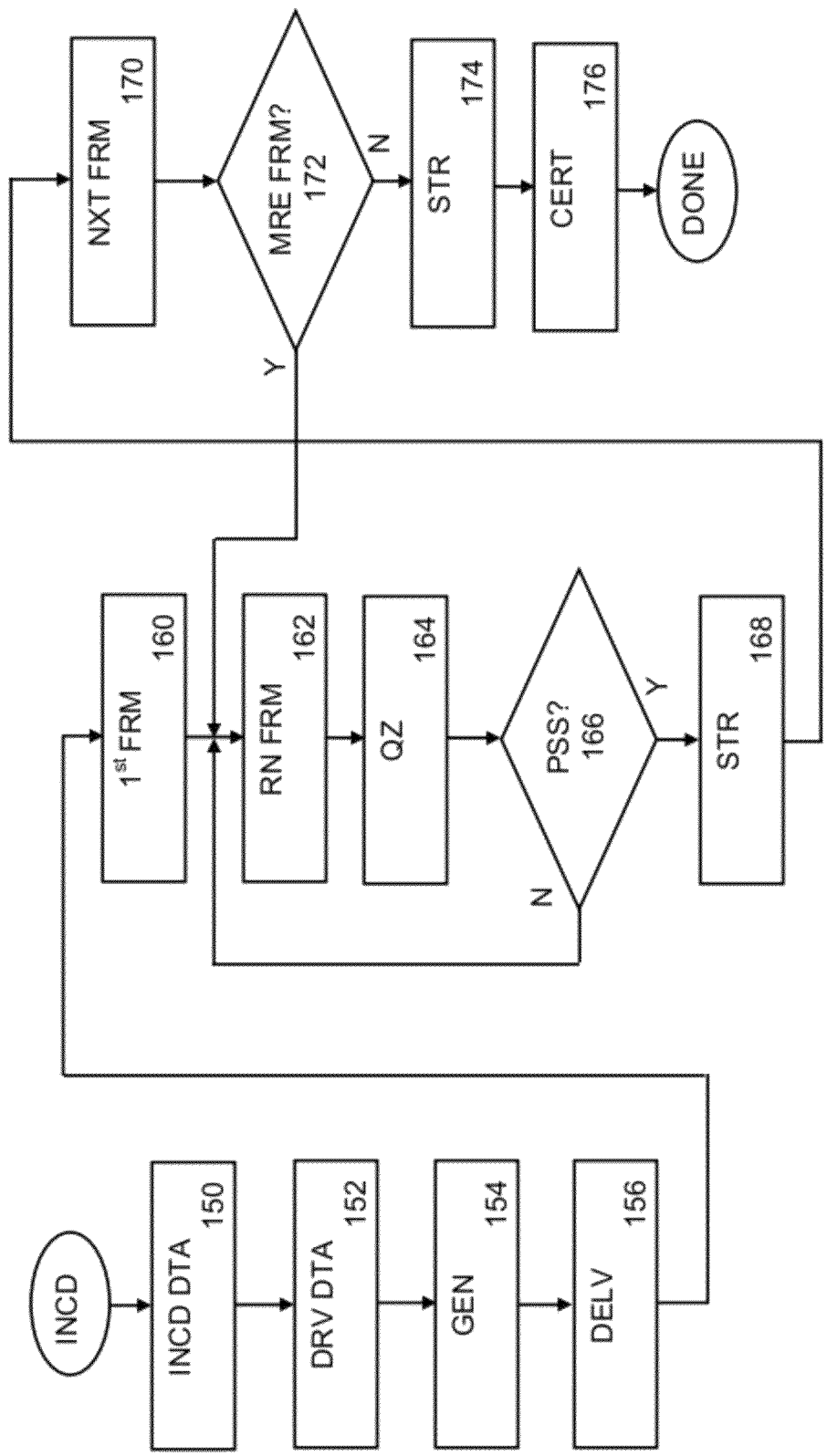
FIG. 10 illustrates a flow chart of a computer-based training system.

Referring to FIG. 10, a flow chart of a computer-based training system is shown. After an incident such as a traffic violation or an accident, data regarding the incident 150 and optionally regarding the driver 152 are transferred to the server and the generator 82/83 generates 154 a remedial lesson 84 that targets areas that are identified by analysis of the data by the generator 82/83. The remedial lesson 84 includes one or more frames 46 that have been determined to be beneficial to the driver, given the circumstances surrounding the incident and/or based upon data known about the driver such as experience level, age, eye sight, prior training, etc.

The remedial lesson 84 is delivered 156 to the driver in any of the same ways or different ways that the lessons 44 of the prior art were delivered. For example, the driver accesses the remedial lesson 84 on-line through the Internet or the remedial lesson 84 is emailed to the driver, etc. However the remedial lesson 84 is delivered, the first frame 46 of the lesson 44 is selected 160 and the content 45 of the frame 46 is run/presented 162, presenting the content 45 of the subject from the remedial lesson 84 to the trainee. Any form of content 45 presentation is anticipated, including flash frames, static text/graphic pages, imbedded text/video/audio, etc.

After presentation 162 to the trainee, often, a quiz 47 is presented 164 to ascertain how much was absorbed by the trainee. If the trainee does not demonstrate possession of enough knowledge 166 (e.g. does not pass 164 the quiz 47 (not shown)), the same frame 46 is re-run 162, re-presenting the content 45 of the subject to the trainee and quiz 47 is again presented 164 to ascertain how much was absorbed by the trainee in subsequent viewings. The above steps 162-164 repeat until the trainee demonstrates possession of enough knowledge 166, and then a next frame 46 from the lesson 44 is selected. In some embodiments, results of the lesson 44 are stored 168 in the driver database 42 (not shown). Such results often include the number of times the content 45 was repeated before a passing grade was achieved, the length of time for each pass, and the quiz 47 scores for each time the quiz 47 was taken.

If there are no frames 46 remaining 172 in the lesson 44, results and/or completion records are saved 174 to the driver database 42 and this training lesson 44 is complete. If there are remaining frames 46 in the lesson 44, the above steps are repeated with the next frame 46.

In some embodiments, the driver and/or company requires a certificate to provide to government agencies, insurers, etc. When required, after completion of the entire remedial lesson 84, a certificate is issued 176 and delivered to the driver and/or company as known in the art.

Although not shown, it is anticipated that the above exemplary method has provisions for saving the context of the remedial lesson 84, allowing the driver to save his or her place during the remedial lesson 84. At a later time, the driver continues where he or she left off in the remedial lesson 84. In this way, the system allows for the driver to complete the remedial lesson 84 at his or her own pace.

Figure 11:
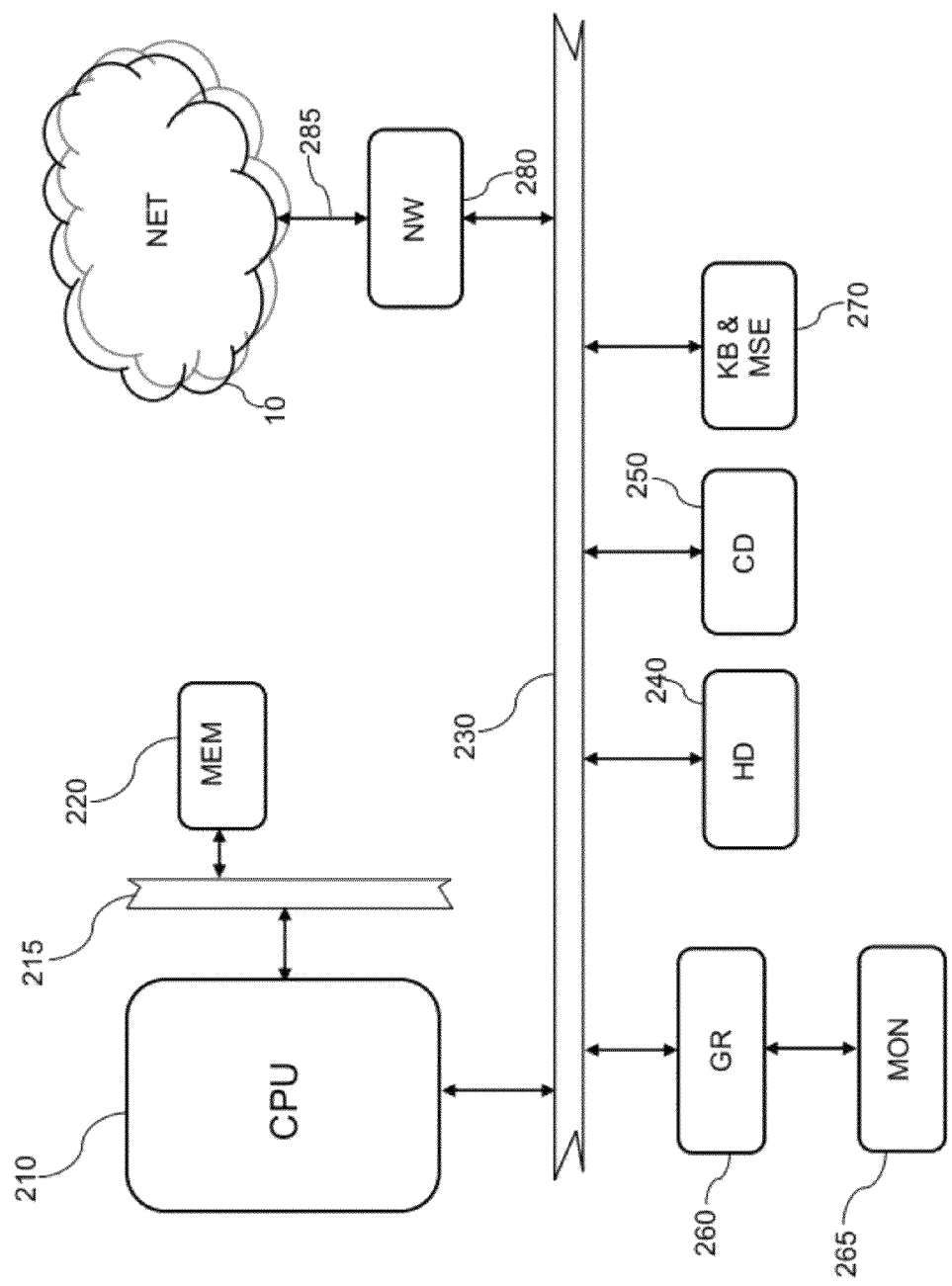
FIG. 11 illustrates a schematic view of a typical computer as used in a computer-based training system.

Referring to FIG. 11, a schematic view of a typical computer system of the present invention is shown. The example computer system represents a typical computer system used as the server 40 and/or the user terminal devices 20. The example computer system is shown in its simplest form, having a single processor. Many different computer architectures are known that accomplish similar results in a similar fashion and the present invention is not limited in any way to any particular computer system. The present invention works well utilizing a single processor system, as shown in FIG. 10, a multiple processor system where multiple processors share resources such as memory and storage, a multiple server system where several independent servers operate in parallel (perhaps having shared access to the data or any combination). In any of these systems, a processor 210 executes or runs stored programs that are generally stored for execution within a memory 220. The processor 210 is any processor or a group of processors, for example an Intel Pentium-4® CPU or the like. The memory 220 is connected to the processor by a memory bus 215 and is any memory 220 suitable for connection with the selected processor 210, such as SRAM, DRAM, SDRAM, RDRAM, DDR, DDR-2, etc. Also connected to the processor 210 is a system bus 230 for connecting to peripheral subsystems such as a network interface 280, a hard disk 240, a disk drive (e.g. DVD, CD) 250, a graphics adapter 260 and a keyboard/mouse 270. The graphics adapter 260 receives commands and display information from the system bus 230 and generates a display image that is displayed on the display 265.

In general, the hard disk 240 is used to store programs, executable code and data persistently, while the disk drive 250 is used to load CD/DVD/Blu-ray disk having programs, executable code and data onto the hard disk 240. These peripherals are examples of input/output devices, persistent storage and removable media storage. Other examples of persistent storage include core memory, FRAM, flash memory, etc. Other examples of removable media storage include CDRW, DVD, DVD writeable, Blu-ray, compact flash, other removable flash media, floppy disk, ZIP®, etc. In some embodiments, other devices are connected to the system through the system bus 230 or with other input-output connections/arrangements as known in the industry.

Examples of these devices include printers; graphics tablets; joysticks; and communications adapters such as modems and Ethernet adapters.

The network interface 280 connects the computer-based system to the network 10 through a link 285 which is, preferably, a high speed link such as a cable broadband connection, a Digital Subscriber Loop (DSL) broadband connection, a T1 line, or a T3 line.

Figure 12:
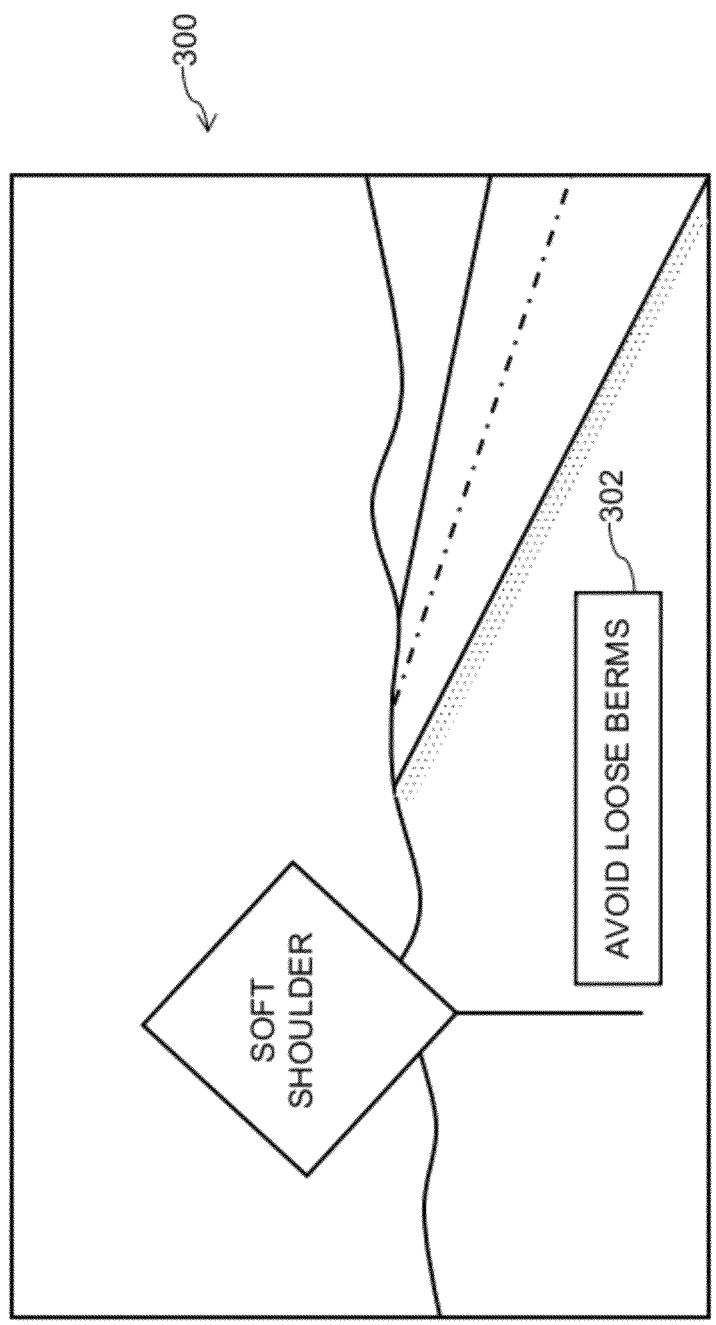
FIG. 12 illustrates a schematic view of an exemplary content portion of a frame as used in a computer-based training system.

Referring to FIG. 12, a schematic view of an exemplary content portion of a frame 46 is shown, as used in a computer-based training system. The described system is not limited in any way to a particular format of content 45, sequence of content 45 and other portions of each frame 46, file layout, etc. The computer-based training system includes any known or future content presentation mechanism, the only requirement being that there are frames 46, each providing content 45 on a particular subject and, each optionally presenting a quiz 47 to determine if the trainee has grasped the particular subject. One exemplary content section 45 is shown in FIG. 11. In this content section 45 of a frame 46, a scene 300 is displayed along with a message 302. In this example, a road having a soft shoulder is displayed and the message informs the trainee that when driving on such roads, the trainee should avoid driving on the loose berms. In this example, the scene 300 is static and the message is a plain text message. Any known or future method of presenting content is anticipated including still images, motion images, three-dimensional images, displayed text, audio messages, etc.

Figure 13:
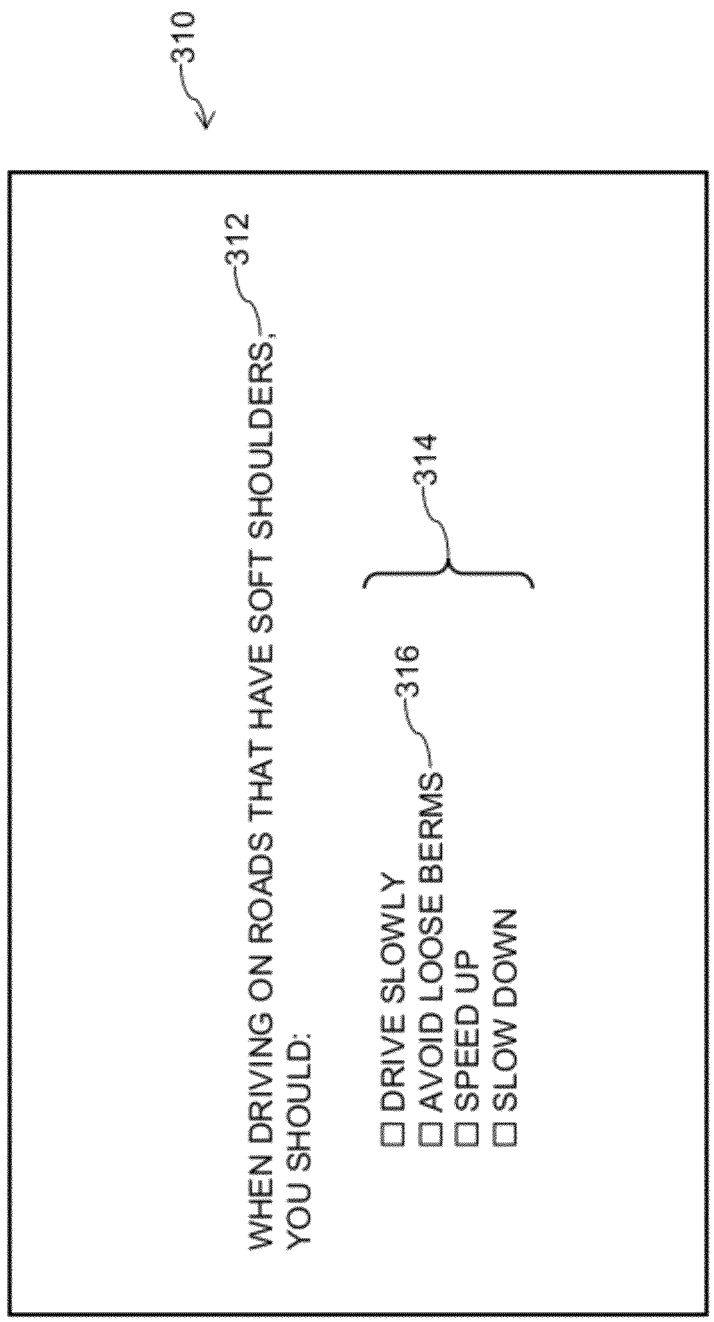
FIG. 13 illustrates a schematic view of an exemplary quiz portion of a frame as used in a computer-based training system.

Referring to FIG. 13, a schematic view of an exemplary quiz portion of a frame is shown, as used in a computer-based training system. The described system is not limited in any way to a particular format of quizzes 47, sequence of quizzes 47 and other portions of each frame 46, file layout, etc. The computer-based training system includes any known or future content presentation mechanism, the only requirement being that there are basic-level frames 46, each providing content 45 on a particular subject and, each optionally presenting a quiz 47 to determine if the trainee has grasped the particular subject. One exemplary quiz section 47 is shown in FIG. 12. In this quiz section 47 of an exemplary frame 46, a question/answer 310 is displayed having a question 312 and a plurality of possible answers 314 (i.e., multiple choices). This example relates to the content of FIG. 11. The correct answer is that the trainee should avoid driving on the loose berms 316. In this example, a question 312 and multiple possible answers 314 are provided as static text. Any known or future method of presenting a quiz 47 is anticipated including still images, motion images, three-dimensional images, displayed text, audio messages, etc. Any form of quiz 47 is anticipate including, but not limited to, multiple choices, fill-in-the-blank, essay, click on the correct object, etc. In some embodiments, the quiz 47 includes any of audio, text, images, video, 3-D images, etc.

Equivalent elements can be substituted for the ones set forth above such that they perform in substantially the same manner in substantially the same way for achieving substantially the same result.

It is believed that the system and method as described and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A remedial lesson generator comprising:
   a computer system having access to storage;
   a plurality of frames located within the storage, each frame having a component of training;
   an incident associated with a person, the incident being a traffic citation for a moving violation or an accident, details of the incident are stored within the storage; and
   software running on the computer system, the software selecting at least one remedial frame from the plurality of frames based upon the details of the incident and the software creating a remedial lesson, the remedial lesson includes the at least one remedial frame;
   wherein the details of the incident includes at least one of the group consisting of a reported speed of a vehicle being operated by the person, a speed of another vehicle involved in the accident, road conditions at the time/place of the incident, climate conditions at the time/place of the incident, time of the incident, visibility at the time/place of the incident, estimate of extent of damage from the accident, and road surface at location of incident.

2. The remedial lesson generator of claim 1, further comprising a profile database, the profile database containing records for a plurality of operators, each of the records includes operator authorization data, operator training records and operator demographics of each operator.

3. The remedial lesson generator of claim 2, whereas the software further selects at least one additional frame from the plurality of frames for inclusion in the remedial lesson based upon data from a record of the profile database associated with the person.

4. The remedial lesson generator of claim 2, whereas the records of the profile database further include ages of each of the operators and the software further selects at least one additional frame from the plurality of frames for inclusion in the remedial lesson based upon the age of the person from a record of the profile database associated with the person.

5. The remedial lesson generator of claim 1, further comprising software that reads the remedial lesson from the storage area and presents the remedial lesson to a client computer-based device associated with the person.

6. The remedial lesson generator of claim 5, wherein the software records which frames are presented to the client computer-based device associated with the person in a record of a profile database, the record associated with the person.

7. A method of remedial training after an incident, the incident being a traffic citation for a moving violation or an accident, the incident associated with a person, the method comprising:
   (a) storing a plurality of frames, the frames accessible by a computer system;
   (b) storing a plurality of records in a profile database, the profile database accessible by the computer system, each record containing data related to an operator;
   (c) receiving details of the incident and storing the details in a storage of the computer system;
   (d) the computer system generating a remedial lesson for the person by assembling a subset of the plurality of frames that are related to the details of the incident into the remedial lesson;
   (e) presenting the remedial lesson to the person; and
   (f) recording results of the remedial lesson in a record of a profile database associated with the person;
   wherein the details of the incident includes at least one of the group consisting of a reported speed of a vehicle being operated by the person, a speed of another vehicle involved in the accident, road conditions at the time/place of the incident, climate conditions at the time/place of the incident, time of the incident, visibility at the time/place of the incident, estimate of extent of damage from the accident, and road surface at location of incident.

8. The method of claim 7, wherein the step of generating a remedial lesson further comprises assembling additional frames into the remedial lesson, the additional frames based upon data related to the person as retrieved from the record of the profile database associated with the person.

9. The method of claim 7, wherein the step of generating a remedial lesson further comprises assembling additional frames into the remedial lesson, the additional frames based upon an age of the person retrieved from the record of the profile database associated with the person.

10. The method of claim 7, wherein the step of generating a remedial lesson further comprises assembling additional frames into the remedial lesson, the additional frames based upon an indication of scheduled training required by the person, the indication of scheduled training retrieved from the record of the profile database associated with the person.

11. The method of claim 7, wherein the step of presenting comprises:
for each frame of the remedial lesson:
(e1) presenting content from the frame to the person;
(e2) quizzing the person to ascertain how much of the content is understood; and
(e3) if the quizzing indicates that the content is not understood, repeating steps e1-e3.

12. A computer-based system for remedial lesson generation, the computer-base system comprising:
a computer;
storage operatively interfaced to the computer;
a plurality of frames located within the storage, each of the frames having a component of training;
an incident, the incident being a traffic citation for a moving violation or an accident, the incident stored within the storage, the incident associated with an operator of a vehicle; and
software running on the computer system, the software selecting at least one frame from the plurality of frames based upon data within the incident and the software creating a remedial lesson for the operator, the remedial lesson includes the at least one frame related to the incident;
wherein the details of the incident includes at least one of the group consisting of a reported speed of a vehicle being operated by the person, a speed of another vehicle involved in the accident, road conditions at the time/place of the incident, climate conditions at the time/place of the incident, time of the incident, visibility at the time/place of the incident, estimate of extent of damage from the accident, and road surface at location of incident.

13. The computer-based system for remedial lesson generation of claim 12, further comprising a profile database, the profile database includes a plurality of profile records, each of the profile records are associated with vehicle-operators, each profile record of the profile includes authorization data, training records and demographics for the vehicle-operator to which the profile record is associated.

14. The computer-based system for remedial lesson generation of claim 13, whereas the software further selects at least one additional frame from the plurality of frames for inclusion in the remedial lesson based upon data within one of the profile records that is associated with the operator.

15. The computer-based system for remedial lesson generation of claim 13, whereas the profile records include ages of the vehicle-operators and the software further selects at least one frame from the plurality of frames for inclusion in the remedial lesson based upon the age of the operator that is retrieved from the profile record associated with the operator of the vehicle.

16. The computer-based system for remedial lesson generation of claim 13, whereas the profile records include an eye-sight measurement of the vehicle-operators and the software further selects at least one additional frame from the plurality of frames for inclusion in the remedial lesson based upon the eye-sight measurement of the operator that is retrieved from the profile record associated with the operator of the vehicle.

17. The computer-based system for remedial lesson generation of claim 12, further comprising software that reads the remedial lesson from the storage area and presents the remedial lesson to a client computer-based device associated with the operator of the vehicle.

18. The computer-based system for remedial lesson generation of claim 13, further comprising software that reads the remedial lesson from the storage area and presents the remedial lesson to a client computer-based device associated with the operator of the vehicle, wherein the software records which frames are presented in the profile record associated with the operator of the vehicle.

19. The computer-based system for remedial lesson generation of claim 12, wherein the vehicle is selected from the group consisting of a truck, a car, a boat, a train and an airplane.

20. The computer-based system for remedial lesson generation of claim 12, wherein the data of the incident is electronically transferred from an on-board computer of the vehicle to the computer.

* * * * *